United States Patent [19]
Newnan

[11] Patent Number: 5,609,097
[45] Date of Patent: Mar. 11, 1997

[54] COFFEE BEAN ROASTER WITH VISUAL DISPLAY COLUMN

[76] Inventor: Brian D. Newnan, 5312 China Garden Dr., P.O. Box 200129, Austin, Tex. 78720

[21] Appl. No.: 427,675

[22] Filed: Apr. 24, 1995

[51] Int. Cl.⁶ .......................... A47J 27/026; A47J 37/04; F26B 17/00; F26B 21/06
[52] U.S. Cl. ................................. 99/470; 99/483; 34/233; 34/594
[58] Field of Search ........................... 99/286, 467, 470, 99/473–476, 483; 34/57 A, 57 R, 62, 67, 359, 360, 372, 576, 428, 391, 368, 393, 493, 494, 544, 549, 555; 426/467

[56] References Cited

U.S. PATENT DOCUMENTS

| | | | |
|---|---|---|---|
| 3,964,175 | 6/1976 | Sivetz | 34/57 A |
| 4,425,720 | 1/1984 | Elevitch | 99/450 |
| 4,639,374 | 1/1987 | Matsunobu et al. | 426/583 |
| 4,875,904 | 10/1989 | Munk | 34/67 |
| 5,185,171 | 2/1993 | Bersten | 426/467 |
| 5,193,444 | 3/1993 | Bar-Sheshet | 99/427 |
| 5,269,072 | 12/1993 | Waligorski | 34/57 E |
| 5,394,623 | 3/1995 | Sewell | 34/544 |
| 5,399,370 | 3/1995 | Hsu | 99/389 R |

*Primary Examiner*—Timothy F. Simone
*Attorney, Agent, or Firm*—Wheat, Camoriano, Smith & Beres, PLC

[57] ABSTRACT

A coffee bean roaster is provided with a cylindrically shaped transparent viewing tower in which coffee beans are roasted by an upwardly directed hot gaseous stream while being fluidized into a visually pleasing ascending central and descending outside columns during the roasting cycle. A two way valve located at the bottom of the tower permits the gaseous stream to enter the tower when the valve is in a first position and the roasted beans to be diverted to a cooling chamber when the valve is in a second position.

28 Claims, 6 Drawing Sheets

COFFEE BEAN ROASTER WITH VISUAL DISPLAY COLUMN

BACKGROUND OF THE INVENTION

This invention relates to a coffee bean roaster and more particularly to a coffee bean roaster employing a hot gaseous stream in a roasting chamber to fluidize and roast the beans in which the interior of the roasting chamber can be observed during operation.

Apparatus for the roasting of coffee beans using hot gas flows are known in the prior art. One example is found in U.S. Pat. No. 3,964,175 issued Jun. 22, 1976 to Sivetz. The Sivetz patent discloses a rectangularly shaped chamber housing a funnel shaped chamber which is partially filed with green coffee beans. A hot gas stream flow is introduced through a screen forming a portion of the lower end of the funnel and the beans are fluidized and roasted. Viewing ports permit a review of the operation of the device. Still another U.S. Pat. No. 5,185,171 issued Feb. 9, 1993 to Bersten describes a roaster that continuously fluidizes and recirculates the beans into the main hot gas stream. U.S. Pat. No. 5,394,623 issued Mar. 7, 1995 to Sewell describes a roaster that fluidizes the coffee beans in a hot air stream for roasting and a temperature sensing device for injecting a spray of water into the gas stream at a point up stream of the roasting chamber to cool and quench the beans.

The prior art lacks a roasting device that can provide a merchandising capability to operations inviting consumers into the premises. The consumers have no way of easily seeing the roasting operation during actual roasting of beans. Still other disadvantages are the need to shut down the roasting operation while cooling the beans, the development of significant heat being transferred to outer surfaces making it undesirable to use the device in commercial establishments, difficulty in removing the beans from the apparatus, and complex cleaning steps required to clean the interior surfaces of the roasting apparatus.

It is therefore an object of the present invention to provide for a roasting system that can maximize the merchandising of roasted coffee beans and beverages made from the beans through making the roasting and cooling operations highly visible to potential consumers.

It is still another object of the present invention to utilize hot gaseous streams to fluidize and roast the coffee beans at temperatures sufficient to roast but not char the beans.

It is still a further object of the present invention to provide for a coffee bean roasting system that permits the simultaneous roasting of one batch of coffee beans while cooling a batch of roasted coffee beans.

It is yet another object of the present invention to provide for a coffee bean roasting system that overcomes the propensity of coffee beans stacking and sticking to interior surface and permits reliable and complete removal of the coffee beans from the roasting chamber into a cooling chamber.

It is still another object of the present invention to provide for a coffee bean roasting system that incorporates convenient loading of coffee beans into the roasting chamber and facilitates access to the interior of the system for cleaning residue on the surfaces thereof.

SUMMARY OF THE INVENTION

A coffee bean roaster apparatus in accordance with the present invention includes a cylindrically shaped tower with transparent walls in which coffee beans are fluidized by and roasted in a upwardly directed hot gaseous stream. The gaseous stream is supplied by a blower connected by a duct to the bottom of the tower and is heated to a temperature sufficient to roast the fluidized beans in the tower. A coffee bean cooling chamber spaced from and communicating with the tower receives the beans following roasting and allows the beans to cool while another batch of green beans is loaded and roasted within the tower. Positioned at the bottom of the tower is a valve assembly that has a first and second position. In the first position, the valve assembly permits the gaseous stream in the duct to enter into the tower and fluidize the beans for roasting. In the second position, the valve assembly diverts the beans within the tower to the cooling chamber for cooling.

When the beans are fluidized within the tower, they form a column substantially centered along the axis of the tower. The column rises until the gaseous stream no longer has sufficient velocity to carry the beans upward. The beans then cascade downwardly along the circumferential regions within the tower where the gaseous stream velocity is substantially less and are recirculated back into the column at the bottom of the tower. To minimize bean loss through the gaseous stream exhaust duct at the top of the tower, the region communicating with the tower has an increasing cross sectional area that reduces the gaseous stream velocity below a level sufficient to carry the beans upward, even when substantially expanded and lighter, to the exhaust duct.

To enhance the visibility of the rising and cascading bean column, a light beam may be focused down the column. To accomplish this a sealed high intensity lamp along with a green bean coffee storage hopper are mounted above the tower on a plate capable of rotating between two positions. In a first position, the lamp is placed so as the beam is directed down the tower and in a second position the bean hopper is enabled to deliver a volume of green beans to the tower for roasting.

BRIEF DESCRIPTION OF THE DRAWING

FIG. 11 is a schematic of a temperature sensing and control system to control the temperature of the beans during the roasting cycle.

DETAILED DESCRIPTION OF THE PREFERRED EMBODIMENT

Figure 1:
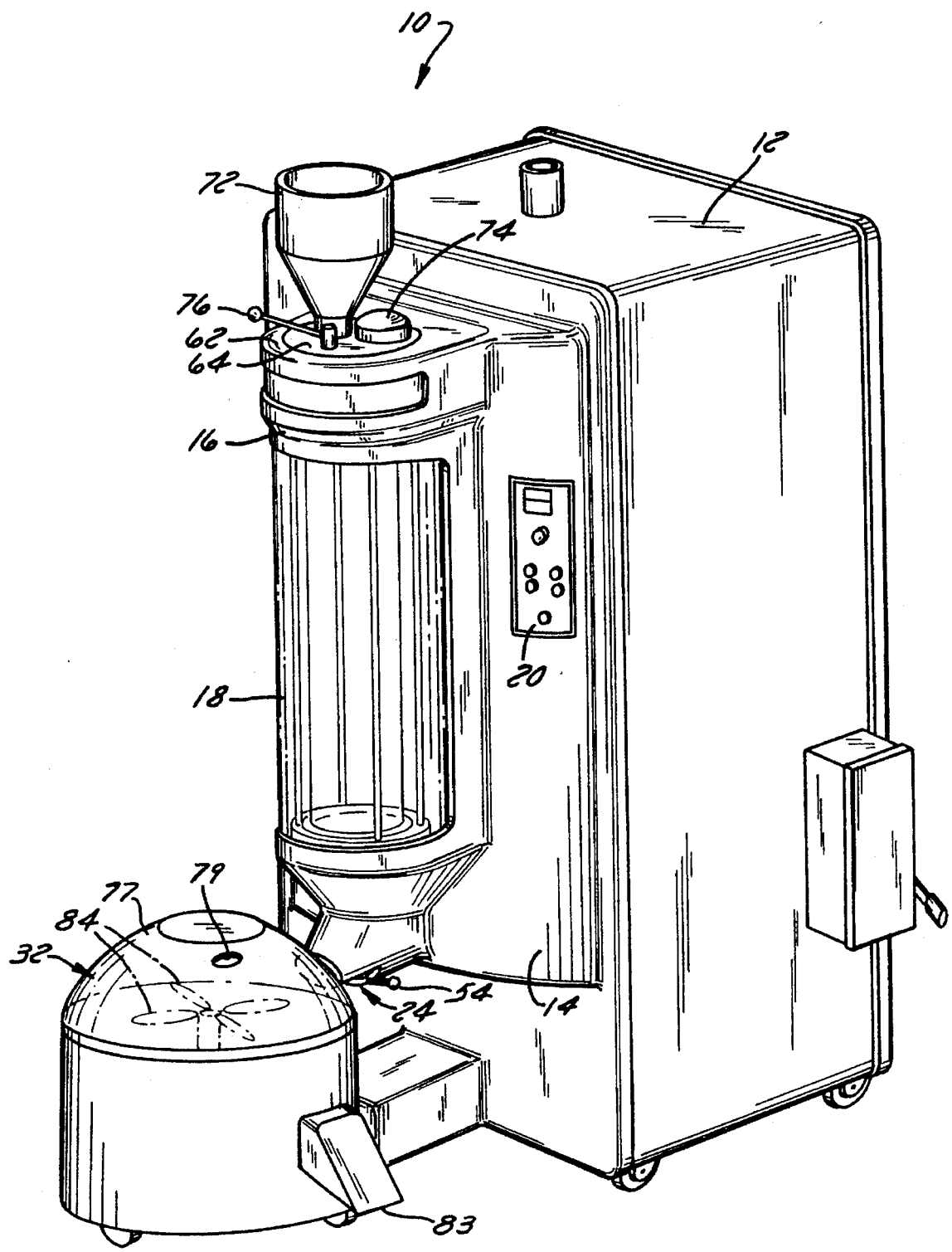
FIG. 1 is a perspective view of the a coffee roaster system in accordance with the present invention.
Figure 2:
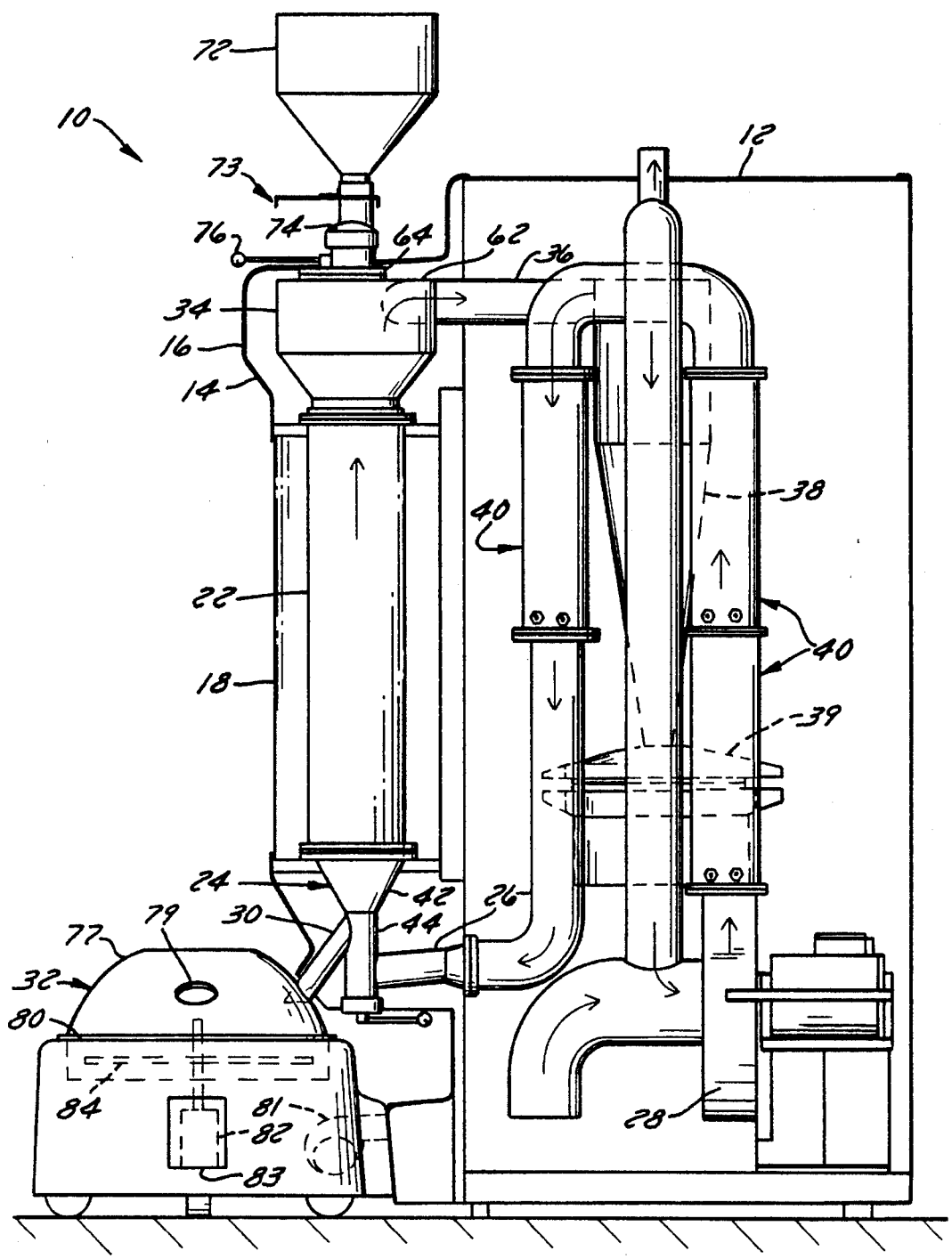
FIG. 2 is a schematic side view of the present invention illustrating the blower, heater, separator and other components of within a housing of the system.

Referring first to the perspective of FIG. 1 and side view of FIG. 2, a roaster system in accordance with the present invention is identified generally by the character numeral 10. System 10 comprises a housing 12 enclosing various components described below and a preformed molded front shroud 14 attached to the front of housing 12 having a an extended curved portion 16 extending outward from housing 12 that incorporates a roaster display window 18. A control panel 20 is mounted on cover 14. As best seen in FIG. 2, a cylindrically shaped coffee bean roaster chamber or tower 22 with a transparent wall is positioned within cover extension 16 and isolated from other parts of the roaster system to minimize unwanted heat transfer. The lower end of tower 22 communicates with a "nozzle" region which comprises a funnel 42 and tube 44. Tube 44 is in turn connected by serpentine gaseous flow line or duct 26 to a blower 28 and by a separate, downwardly inclined passageway 30 to a coffee bean cooling chamber 32. A heater 40, which, by way of example, may be in the form of resistance wire positioned within duct 26 to heat the gaseous stream provided by blower 28 to tower 22. The upper end of tower 22 communicates with a region diverging into one of a larger cross-section called "unloader" 34.

The aroma from a coffee bean roasting operation may produce an objectionable odor when the coffee bean bed temperature exceeds about 470° F. Certain roasting techniques frequently reach that temperature and beyond. Some objectionable odor then is present toward the end of the roasting period. Thus, it becomes important that the odors are exhausted through an external vent. This is accomplished by exhausting the gaseous stream and chaff through a duct 36 directly to a separator 38 and a chaff collection drum 39 that collects coffee bean particle residue or chaff.

As mentioned above, a major objective of the present invention is to provide a visual display of the coffee beans being roasted to enhance the merchandising of the roasted coffee. Thus, the center of the transparent tower 22 is preferably mounted within the system 10 at about average eye level. Because of the high temperatures involved, it is important that the tower not be easily touched by operators or observers and composed of materials such as, for example, heat tempered glass having a low thermal coefficient of expansion. The curved outer window 18 of shroud 14 may be comprised of a heat resistant transparent material such as a plastic. By providing a cover shroud 14 and window 18 to the apparatus, operators and observers are separated from the hot surfaces of tower 22 but can easily view the interior. The precise diameter of tower 22 is not an essential feature of the invention but should be sufficient to accommodate most loading and operating requirements. It has been found that a glass cylinder having an outside diameter of about 7 inches performs efficiently for most situations as a roasting tower.

Figure 3:
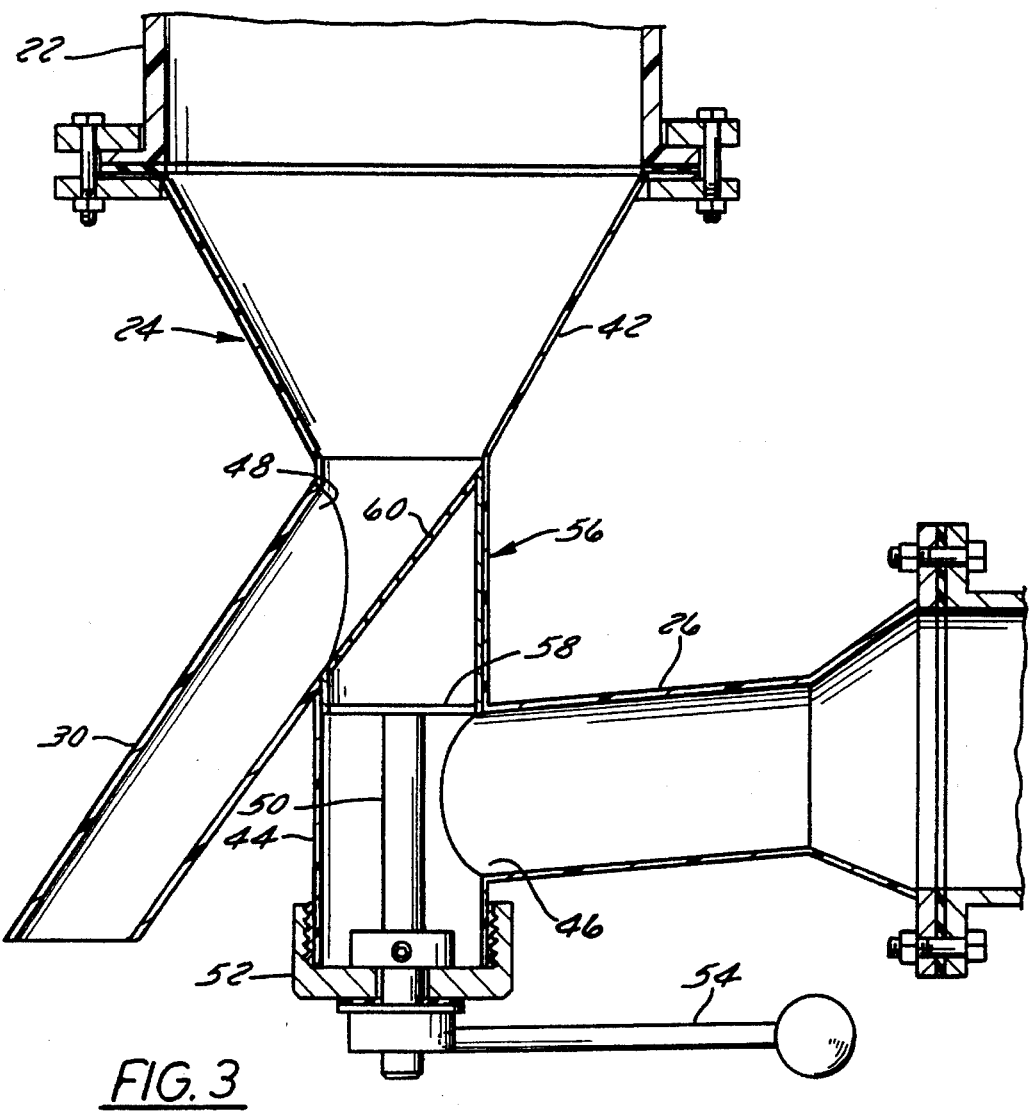
FIG. 3 is a side cross-sectional view of a three way valve attached to the bottom of the roasting tower in a coffee bean position in which the tower is placed in communication with the cooling chamber passageway opened.
Figure 4:
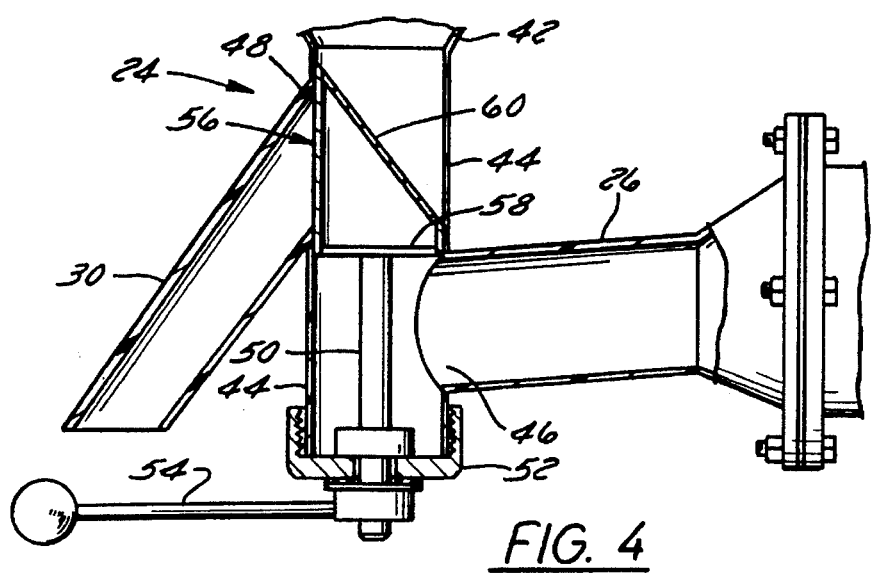
FIG. 4 is a cross-sectional view of the three way valve in a gaseous stream admitting position in which the blower duct is in communication with the tower and the cooling chamber passageway is closed.
Figure 5:
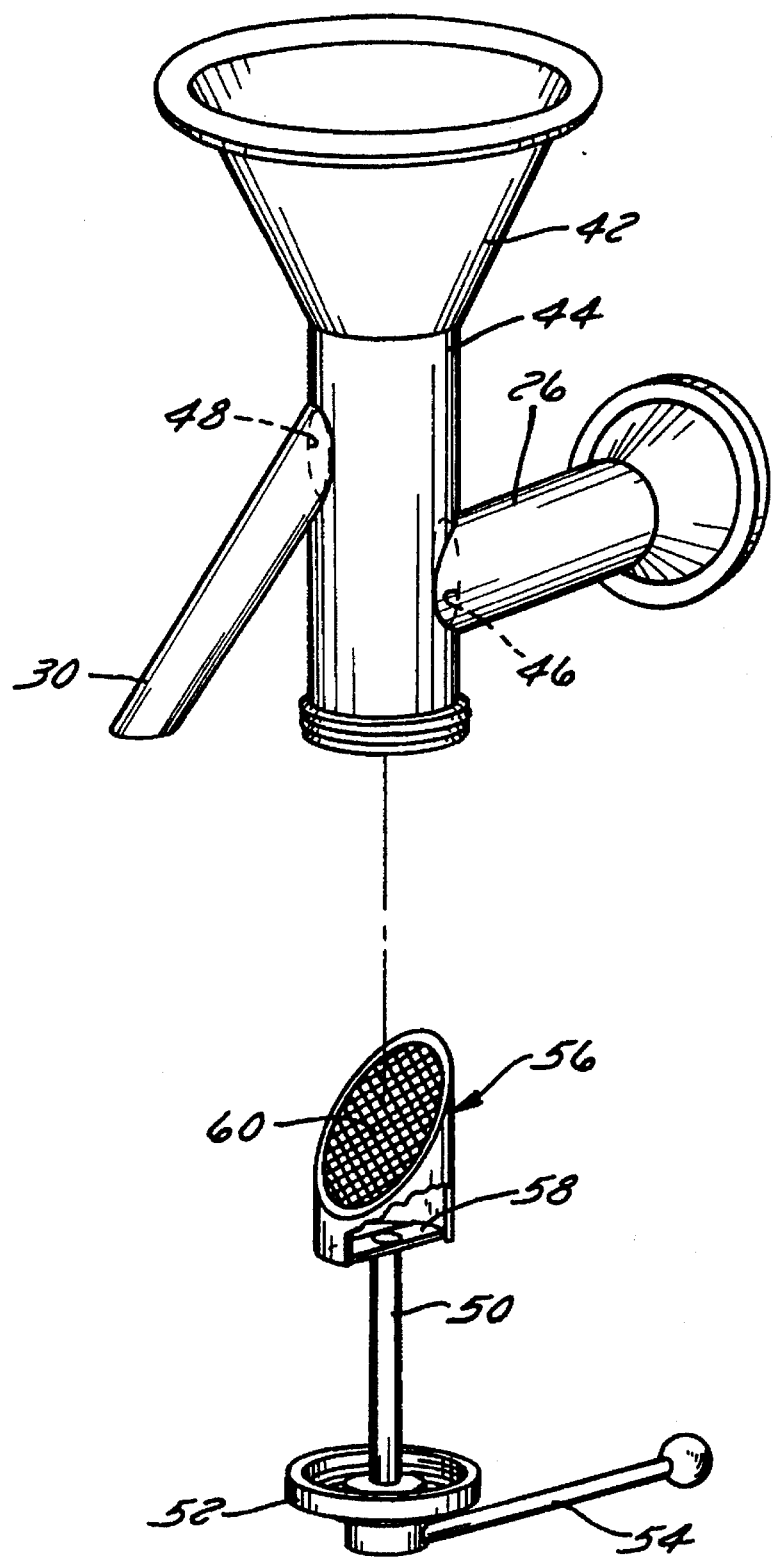
FIG. 5 is a perspective exploded view of the three way valve.

Reference is made to FIGS. 3–6 that depict various views of nozzle 24 and the structure providing the desired gas stream velocity and configuration into tower 22. Use is made of a three-way valve as part of nozzle 24 for selectively opening tower 22 to the hot gaseous stream from blower 28 or diverting the roasted beans in tower 22 to cooling chamber 32. Nozzle 24 comprises an area 42 of tower 22 that funnels down into a tube 44. Tube 44 defines a pair of openings 46 and 48 that respectively open into blower duct 26 and cooling chamber passageway 30. A rod 50 coaxially aligned with the longitudinal axis of tube 44 is mounted for rotational motion in a sleeve 52 threadedly engaged to the distal end of tube 44. A lever arm 54 for rotation of rod is secured to the end thereof. The other end of rod 50 supports a cylindrically shaped valve member 56 open at both ends and having an outside diameter closely matching the inside diameter of tube 44. Rod 50 may be welded to a strip or strips 58 welded to and extending across the bottom end of valve member 56, thus maintaining that end of member 56 open. As perhaps best viewed in FIGS. 3, 4, and 5, the upper end of valve member 56 is cut at a diagonal and covered by a screen 60. In a first or coffee bean diverting position of valve 56 as seen in FIG. 3, screen 60 faces passageway 30 and opening 48.

Preferably all interior surfaces coming in contact with the coffee beans should be inclined at angles greater than the "angle of repose" of the beans. The angle of repose may be defined as the angle at which the beans begin to slide or tumble down a surface due to gravity, thus overcoming frictional and/or adhesive characteristics of the coffee beans. The angle of repose of coffee beans is typically ranges up to a maximum of about 30° for worse case situations involving particularly sticky beans such as dark roasted coffees having heavy oils residing on the outside of the beans. The angle of inclination of screen 58 is set an angle greater than the angle of repose of the coffee beans. Thus, the beans tumble from tower 22 and over the surface of screen 60 through opening 48 into passageway 30 also inclined at an angle greater than the angle of repose of the beans. The beans thus move directly into cooling chamber 32. In a second or gaseous stream passing position of valve member 56, screen 60 faces in the opposite direction and member 56 closes off opening 48. The gaseous stream entering tube 44 from the blower duct 26 passes through valve member 56 (and screen 60) and enters into tower 22.

Blower 28 mounted within housing 12 must provide sufficient velocity to the gas stream to provide for fluidization of the coffee beans. Because blower 28, the only major component with continuously moving parts, is appropriately separated from the chaff and hot gas temperatures, the working life expectancy is significantly increased. Such separation also permits the use of any commercially available blowers having the capacity to provide the necessary gaseous stream velocities. For example, the various types of high pressure direct drive blowers available from the Dayton Electric Manufacturing Company have been found to perform satisfactory. The gaseous stream provided from blower 28 must be heated to temperatures that effectively roast but not char the green coffee beans loaded into tower 22. While any technique of heating the stream may be employed to reach the desirable roasting temperatures of about 650° F., it is preferred to use high watt density radiant heaters consisting of a nickel chrome alloy wire contained within ducts 26. Similarly, separator 38 is a commercially available commodity and may be obtained, for example, from Fisher-Klosterman Inc. located in Louisville, Ky. under Model Number XQ 120-3.

Figure 6:
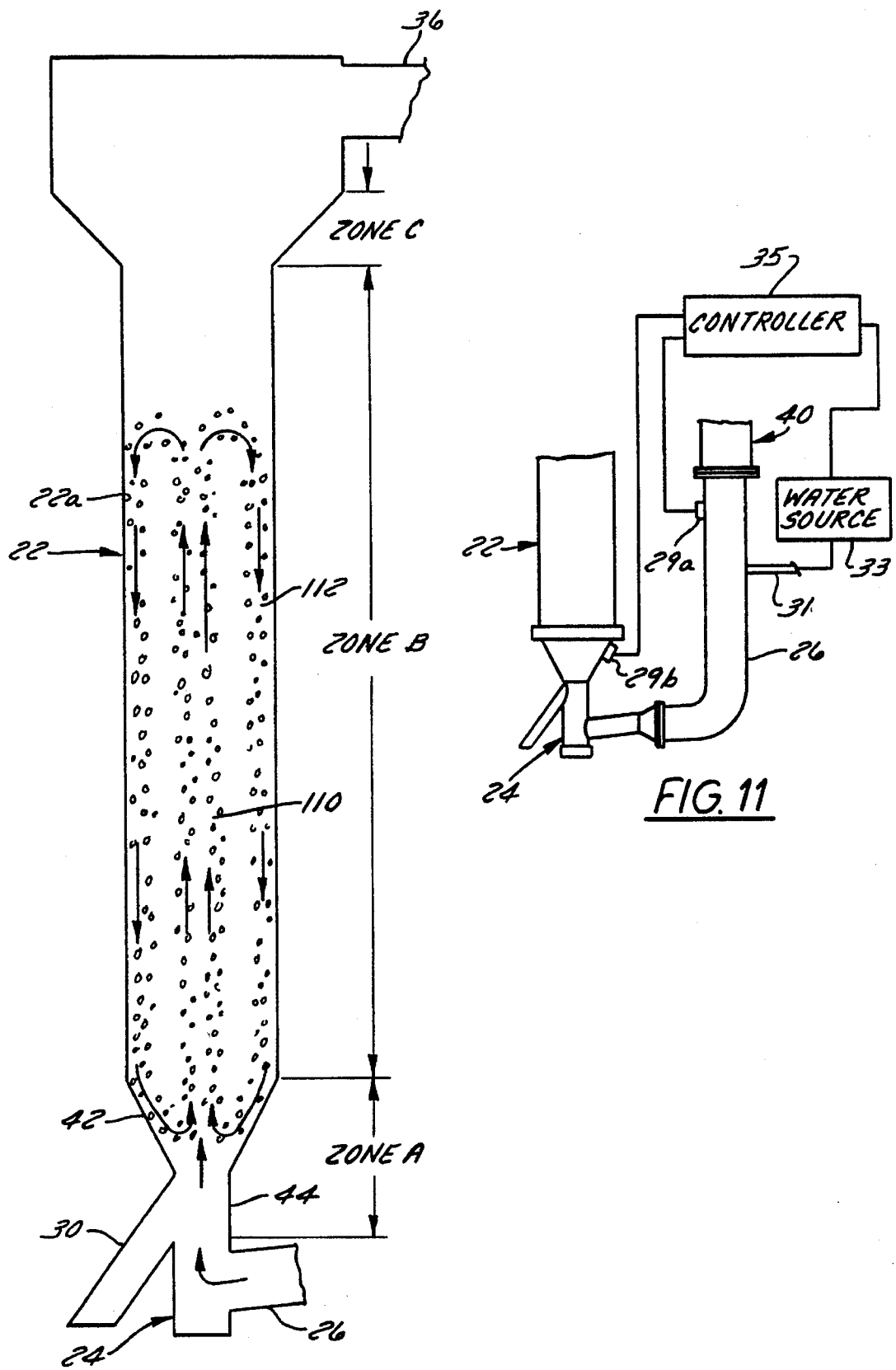
FIG. 6 is a schematic illustrating the fluidization and rising of the beans within the roasting tower.

Reference is now made to the schematic of FIG. 6. Initially before blower 28 is energized, the green coffee beans are at rest within the bottom portion of tower 22 and nesting within nozzle region 24, primarily funnel 42, may extend three or four inches into tower 22. This is indicated as zone A in FIG. 6. The entire center portion of the beans must be lifted before fluidization can occur. The gaseous stream has sufficient velocity upon entrance into tube 44 to lift the central portion of the beans into tower 22. Once the beans are lifted, less energy is needed to fluidize the central mass. As the cross-sectional area of funnel 42 increases, the initial velocity of the gaseous stream smoothly drops off and reaches a velocity still sufficient to fluidize and float the beans upward. As the green beans are lifted and separated, the velocity of the gas is greater than the terminal velocity of the green coffee beans and the beans continue to rise, forming a rising column 110, i.e., "columnizing" within zone B along essentially the center of tower 22. As long as the gaseous stream velocity is greater than the bean terminal velocity, the beans will continue to rise until the velocity has dropped off to a point that it becomes equal to the terminal velocity. At that point, column 110 crests and the beans tend to cascade toward the outer circumferential region within tower 22 adjacent the inner wall 22a. The gaseous stream has a significantly greater velocity within column 110 in comparison to the outer circumferential region at the same height due in part due to the "nozzling effect" of nozzle 24. The nozzling effect is caused by the directing the gaseous stream upward along the central axis of tower 22 from the smaller cross sectional area of nozzle region 24. Since the velocity of the stream is much less at the outer circumferential regions 112 within tower 22, beans floated into this region will fall back into the funnel area 42 and be reintroduced back into the core gaseous stream. The overall effect viewing through the transparent walls of tower 22 and display window 18 of the fluidization and columnization is a pleasant visual experience, i.e., a waterfall of coffee beans.

As roasting continues the coffee beans expand significantly and become considerable lighter. For example, beans roasted for espresso purposes can lose 25% of the weight and expand nearly 50%. Thus, as roasting occurs and the beans expand, i.e. become lighter, column 110 will slowly rise and care must be taken that the top of column 110 does not rise close to the junction with duct 36 leading to cyclone separator 38 where the suction generated by separator 38 is significant and the air velocity often reaches 1000 feet per minute. The structure of unloader 34, however, minimizes this possibility. As shown in FIG. 6, there is a substantial increase in the cross-sectional area within transitional zone C into unloader 34. Thus, the gaseous stream velocity is reduced markedly but still sufficiently high to carry the lighter coffee bean chaff, and exhaust fumes and odors to the opening of duct 36 and thus away from tower 22. The reduction in velocity of the gaseous stream is specifically made to be below the lightest roasted coffee bean terminal velocity and thus the beans that reach the top of column 110 tend to move toward the circumferential regions 112 and drift back down tower 22.

As stated above, it is important that the temperature of the beans while being roasted not exceed about 650° F. or undesirable charring may occur. To prevent charring, the apparatus is provided with a thermistor 29a along duct 26 immediately after the last heater 40 as best seen in FIG. 11. Thermistor 29a is positioned on duct 26, continuously measures the temperature of the hot gaseous stream, and is set to operate at a predetermined upper set point such as, for example, 650° F. Upon reading a temperature equal to the set point, thermistor 29a either directly or through a controller 35 causes water to flow from water source 33 through spray passage 31 into duct 26 as fine spray at the rate of about 1 gallon per 100 pounds of coffee beans. The spray of water flashes into steam upon entry into tower 22. The high heat of vaporization needed to flash into steam draws considerable heat from the beans and lowers the temperature to a level below the charring range. A second thermistor 29b may be placed adjacent the bottom of tower 22 to monitor the temperature of the coffee bean mass at that point. Thermistor 29b is programmed to have a set point at the optimum roasting temperature desired, for example, 400° to 450° F. When this temperature is reached, thermistor 29b either directly or through a controller 35 activates the water spray as before. Typical prior art roasting devices that employ temperature control devices general monitor temperatures in the gaseous exhaust and therefore obtained readings that approach the average coffee bean temperature. Some coffee beans thus still reach a charring state. Herein, however, by measuring directly the coffee bean mass temperature at the bottom of tower 22, the hottest bean temperature is obtained and thus charring of the hottest beans is largely minimized.

Figure 7:
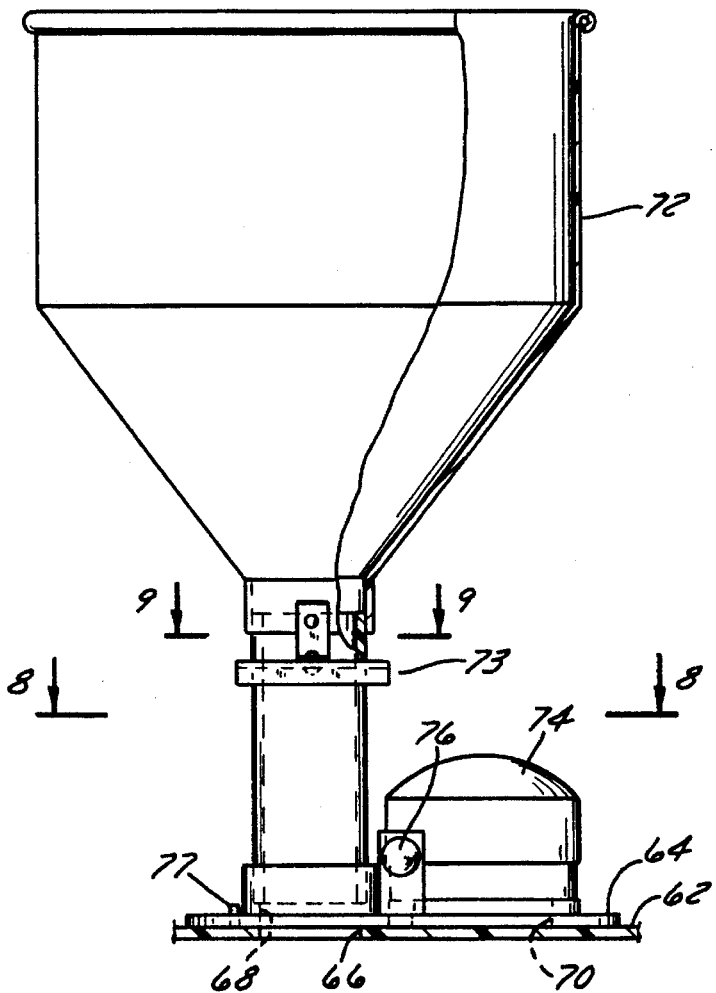
FIG. 7 is a side view of a rotating slide valve for permitting loading of the tower with coffee beans from a hopper in first position and illuminating the interior of the tower with a high intensity lamp in a second position.
Figure 10:
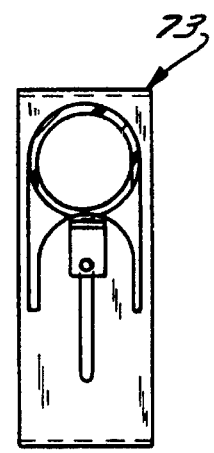
FIG. 10 is a sectional view taken along lines 9—9 of FIG. 7 of a slide valve arrangement for the hopper in the open position.
Figure 8:
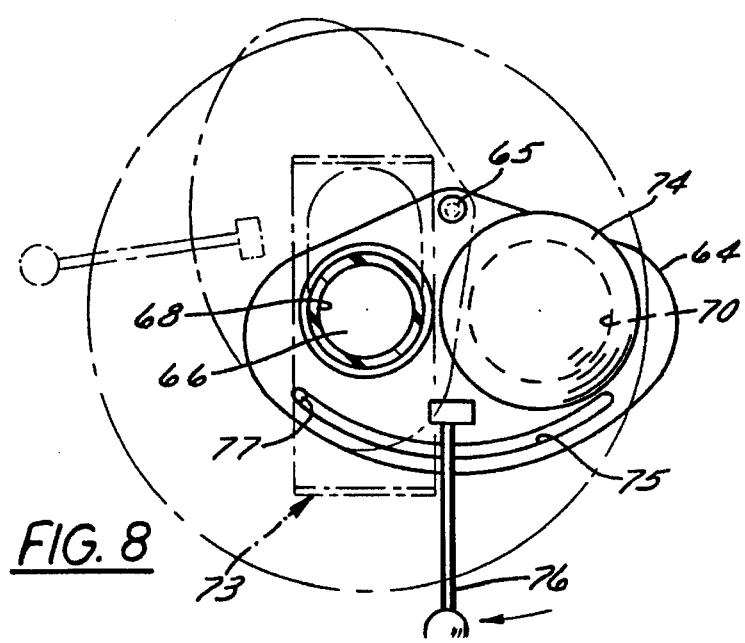
FIG. 8 is a top sectional view of the rotating slide valve of taken along lines 8—8 of FIG. 7.
Figure 9:
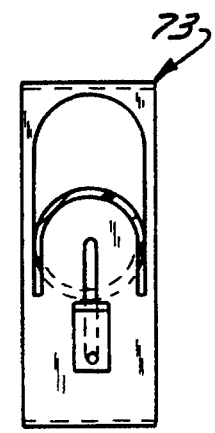
FIG. 9 is a sectional view taken along lines 9—9 of FIG. 7 of a slide valve arrangement for the hopper in the closed position.

Reference is now made to FIGS. 7 and 8 together with FIG. 1 depicting the top surface or plate 62 of unloader 34 having a carrier plate 64 pivotally attached by pin 65. Plate 62 is provided with a centered opening 66 that is adapted to be in registry with one of the openings 68 and 70 in carrier plate 64. A coffee bean loading hopper funnel 72 is mounted to carrier plate 64 above opening 68 while a high intensity sealed lamp 74 is mounted in a sealed arrangement to carrier plate 64 over opening 70. A slot 75 in carrier plate 64 registers with a pin 77 extending upward from plate 62 and serves as a stop for plate 64 at a first position at which opening 68 is centered over opening 66 or a second position when opening 70 is centered over opening 66. An operating lever 76 is attached to carrier plate 64 to manipulate or rotate the valve between the first and second positions. Thus, in the first position, it is possible to load tower 22 with the requisite amount of green coffee beans from hopper funnel 72 in preparation for roasting. Hopper funnel 72 may be provided with a slide valve 73 to ensure that beans do not tumble out until opening 66 and opening 68 are placed in registry. Moving the carrier plate into the second position permits the water fall effect of the beans to be centrally illuminated to further enhance the visual effect.

Once roasting of coffee beans residing in tower 22 has been completed and blower 28 has been de-energized, it is necessary to cool the beans. One of the named disadvantages of the prior art roasters is that cooling of the beans often takes place in the roasting chamber itself. In such prior art devices the entire roasting apparatus is completely devoted to cooling the beans. Thus, the next roasting cycle must be delayed until cooling is completed. Moreover, the hot interior surfaces and structures of the apparatus are cooled down. When a new roasting cycle is initiated, those same surfaces and structures must be heated again, resulting in a substantial increase of energy requirements and costs. In contrast, however, the present roasting invention avoids the long term interruption of the roasting cycles and avoids the need to cool and then reheat the roasting chamber by removing the beans from the tower 22 as soon as roasting is completed and the beans are cooled in cooling chamber 32. By positioning valve member 56 in its bean diverting position (shown in FIG. 3), the beans are moved under their own weight into cooling chamber 32. As best illustrated in FIGS. 1 and 2, cooling chamber 32 has a detachable transparent hemispherical dome 77 covering a upper horizontal screen 80. Screen 80 provides support for the coffee beans entering from the roasting chamber. Dome 77 is provided with a central opening 79 that permits the entry of cooling air being sucked into dome 77 and through the beans on screen 80 by a blower 81. Positioned below screen 80 is a motor 82 that drives a set of agitating blades 84 that rotate to agitate and help accelerate cooling of the coffee beans. Blower 81 is provided with an exhaust opening 83 that allows the pleasing aroma of the cooling beans to be exhausted into the atmosphere immediately surrounding the cooling chamber 32.

As should be noted from above, the areas in contact with the coffee beans and cleaning agents are limited to the internal surfaces of roasting tower 22, nozzle region 24, cooling chamber 32, unloader 34 and the connecting passageways. It is therefore preferable that such components be constructed of inert materials such as stainless steel or heat treated glass materials. All other components, however, can be constructed of less expensive but durable materials. It is clearly necessary that the such interior surfaces coming into contact with the beans be cleaned periodically. However, it is also preferable that tower 22 be fixed in place since the column is heavy and easily chipped. To gain access to and aid in cleaning the exposed interior surfaces, carrier plate 64 may be completely removed from plate 62 to permit direct entry through opening 66 into tower 22 where the surfaces can be cleaned using appropriate cleaning fluids To initiate operation of the roasting apparatus, coffee beans in a desired amount are placed into funnel hopper 72 that is attached to carrier plate 64 which is then rotated to the first position in which openings 66 and 68 are in registry. Three way valve is rotated to the first position, plugging the entry into the cooling passageway 30, but allowing unimpeded air flow into tower 22 from blower 28 when energized. The funnel slide valve 73 then is opened and the beans then fall into tower 22 and rest in the lower portion thereof. Blower 28 and heaters 40 are energized and the beans are fluidized and roasted in tower 22. The temperature of the gaseous stream is monitored by thermistor 29 and a spray of water may be introduced into the hot gaseous stream just prior to entry into the tower should the sensed temperature be deemed to be approaching charring levels. The water flashes into steam, but the heat of vaporization removes considerable heat from the beans. When the roasting cycle is completed valve is rotated to its second position in which the beans can effectively tumble into cooling chamber 32. The velocity of the gaseous stream ensures that even beans having sticky oils attached thereto will be jostled from being "glued" to the internal surfaces of the roaster.

It is understood that in light of a reading of the foregoing description and drawings that those with ordinary skill in the art will be able to make changes and modifications to the present invention without departing from the spirit or scope of the invention as defined in the following appended claims.

I claim:

1. A coffee bean roaster apparatus including
   (a) a tower in which coffee beans are fluidized by and roasted in a upwardly directed hot gaseous stream;
   (b) a gaseous stream line connecting said tower to a blower for supplying the gaseous stream at a velocity sufficient to fluidize a predetermined quantity of beans introduced into the tower;
   (c) a heater for heating the gaseous stream to a temperature sufficient to roast the fluidized beans;
   (d) a coffee bean cooling chamber spaced from and communicating with said tower for receiving said beans following roasting and allowing said beans to cool to a predetermined temperature; and
   (e) valve assembly means positioned intermediate said gaseous line and said tower for allowing said gaseous stream to egress into said tower when positioned in a first position and allowing said beans to move from said tower into said cooling chamber when positioned in a second position.

2. The apparatus of claim 1 including a gas exhaust line communicating with the top of said tower for exhausting the hot gaseous stream from said tower and means located at the top of said tower for preventing beans in said tower from moving into said exhaust line.

3. The apparatus of claim 2 including
   hopper means for holding a volume of coffee beans for roasting in said tower,
   illuminating means for illuminating the interior of said tower, and
   selection means associated with said tower for moving between first and second positions in which said first position said hopper means is enabled to unload said beans into said tower and in which said second position said illuminating means is enabled to illuminate the interior of said tower.

4. The apparatus of claim 1 in which said cooling chamber is a drum communicating with an air blower for supplying a flow of cooling air through said drum and coffee beans housed therein.

5. The apparatus of claim 4 in which said drum has a top with an opening for entry of air therethrough and a screen for supporting said beans.

6. The apparatus of claim 4 wherein said blower exhausts the air into the atmosphere at a position adjacent said cooling drum thereby providing a coffee bean aroma in the vicinity of said roaster.

7. The apparatus of claim 1 in which said tower is made of transparent and heat tempered material to permit viewing of the roasting process.

8. The apparatus of claim 1 in which said valve assembly means includes a first member having a first opening into a first passageway connecting said gaseous line to said tower and a second opening connecting said tower to said cooling chamber and a movable second member for selectively opening and closing said first and second openings.

9. The apparatus of claim 8 in which said movable second member has an element diverting beans in said tower through said second opening when said movable member is in a cooling chamber position in which said second opening is open.

10. The apparatus of claim 9 in which said element permits the gaseous stream to pass therethrough when said movable member is in a gaseous stream position and said first opening is open.

11. The apparatus of claim 8 including
    a connecting member communicating with said tower and having first and second openings respectively associated with said gaseous line and said cooling chamber and
    a movable member mounted for rotational movement within said connecting member, said movable member closing said second opening when rotated into a first position.

12. The apparatus of claim 11 in which said movable member includes a diverting element positioned across said connecting member so as to divert said beans under the force of gravity through said second opening into said cooling chamber when said movable member is rotated into a second position.

13. The apparatus of claim 12 in which said movable member is tubularly shaped and open at lower and upper ends, said diverting element being a screen mounted across and entirely enclosing the open upper end, said screen further being mounted at an angle to the rotational axis of said member greater than the angle of repose of said coffee beans.

14. The apparatus of claim 13 in which said connecting member is a cylindrical pipe having a diverging top portion integral with a bottom circumferential edge of said tower, said sleeve being cylindrical, mounted to said connecting member for rotational movement, and connected to a rod downwardly extending below said connecting member and having a handle for manual rotational movement of said sleeve between said first and second positions.

15. A coffee bean roaster system for the roasting and cooling of coffee beans including (a) a roaster tower adapted to receive green coffee beans from a loading station positioned near the top of said tower, (b) a blower connected to the bottom of said tower by a line for providing a gaseous stream directed up the center of said tower, said gaseous stream provided a predetermined velocity greater than the terminal velocity of the green beans in a region of said tower extending from a bottom of said tower a substantial distance along the vertical axis of said tower thereby causing said green beans to form a column within said tower at the top of which the gaseous velocity and said terminal bean velocity become substantially equal and said beans are carried to the side of the tower and drift toward the bottom thereof, (c) a heater for heating the gaseous stream while within said line to a temperature sufficient to cause said green beans to change to roasted beans of a lighter density within said tower thereby causing said column of beans to progressively become higher, (d) a gaseous stream exhaust line connected to the top of said tower for exhausting the hot gaseous stream from said tower, and (e) means for lowering the velocity of the hot gaseous stream below the terminal velocity of roasted coffee beans adjacent the connection between said exhaust line and said tower thereby reducing the amount of coffee beans exhausted through said exhaust line.

16. The system of claim 15 wherein said means comprises an unloading structure in communication with said top of said tower and having an upward diverging cross-sectional area diameter to diminish the hot gaseous stream velocity.

17. The system of claim 15 including a separator connected to said unloading structure through said exhaust line for collecting residue from said beans being roasted in said tower.

18. The system of claim 15 in which the gaseous stream is heated to about 650° F.

19. The system of claim 18 in which the temperature of said gaseous stream is monitored and a spray of water is introduced into said gaseous stream at a point upstream of said tower when the temperature of said stream reaches a predetermined level.

20. The system of claim 15 wherein said tower is transparent.

21. The system of claim 20 including a lamp for illuminating the column of beans within said tower.

22. A coffee bean roaster system for the roasting and cooling of coffee beans including (a) loading means for holding a volume of coffee beans;

(b) a roaster tower adapted to receive green coffee beans from said loading means, said tower having a top wall with an opening therein;

(c) a blower connected to the bottom of said tower by a line for providing a gaseous stream directed up the center of said tower, said gaseous stream provided a predetermined velocity greater than the terminal velocity of the green beans in a region of said tower extending from a bottom of said tower a substantial distance along the vertical axis of said tower thereby causing said green beans to form a column within said tower at the top of which the gaseous velocity and said terminal bean velocity become substantially equal and said beans are carried to the side of the tower and drift toward the bottom thereof;

(d) a heater for heating the gaseous stream while within said line to a temperature sufficient to cause said green beans to change to roasted beans of a lighter density within said tower thereby causing said column of beans to progressively become higher;

(e) an illumination means associated with said tower for illuminating the interior of said tower and said coffee beans when fluidized; and (f) a valve means associated with said top wall for selectively placing said loading means and said illumination means in first and second positions to respectively allow beans to enter into said tower and illuminate the interior of said tower.

23. The system of claim 22 in which said valve means is a plate pivotally attached to said top wall and having first and second openings registering with said top wall opening in respective first and second positions.

24. The system of claim 23 in which said loading means is a funnel structure connected to said plate over said first opening and said illuminating means is a sealed light structure connected to said plate over said second opening.

25. A system for the roasting of and subsequent cooling of coffee beans comprising a blower adapted to provide a gaseous stream;

a heater for heating the gaseous stream to a temperature sufficient to roast coffee beans;

a tower adapted to receive green coffee beans and the heated gaseous stream, said gaseous stream flowing through a first bottom entrance to said tower with a sufficient velocity to lift and fluidize the beans within said tower;

a cooling chamber for cooling roasted coffee beans received from said tower;

a valve assembly associated with said tower at the bottom thereof and having first and second positions, said valve assembly in said first position permitting the gaseous stream to flow into said tower and in said second position permitting roasted beans to flow by gravity into said cooling chamber whereby said tower can be refilled with green beans and said valve assembly can be placed in said first position for roasting of green beans in said tower simultaneously with cooling of said roasted beans in said cooling chamber.

26. The system of claim 25 in which said cooling chamber communicates with said valve assembly by a passageway inclined at an angle greater than the angle of repose of roasted coffee beans in said tower.

27. The system of claim 26 including an tubular member communicating with the bottom of said tower, said valve assembly including a screen element rotatably positioned within said tubular member, said screen element when said assembly is in said first position permitting the gaseous stream to flow through said tubular member into said tower and when said assembly is in said second position deflecting said roasted beans from said tower into said passageway.

28. The system of claim 27 in which said screen has an angle of inclination greater than the angle of repose of said roasted coffee beans.

* * * * *